United States Patent
Watanabe et al.

(10) Patent No.: US 6,863,929 B2
(45) Date of Patent: Mar. 8, 2005

(54) METHOD FOR FORMING COATED FILM AND INTERMEDIATE COATING MATERIAL

(75) Inventors: Masakazu Watanabe, Hiroshima-ken (JP); Takuhiro Kakii, Hiroshima-ken (JP); Takakazu Yamane, Hiroshima-ken (JP); Tsutomu Shigenaga, Hiroshima-ken (JP)

(73) Assignees: Nippon Paint Co., Ltd., Osaka-Fu (JP); Mazda Motor Corporation, Hiroshima-Ken (JP)

( * ) Notice: Subject to any disclaimer, the term of this patent is extended or adjusted under 35 U.S.C. 154(b) by 233 days.

(21) Appl. No.: 10/347,270

(22) Filed: Jan. 21, 2003

(65) Prior Publication Data

US 2003/0158321 A1 Aug. 21, 2003

(30) Foreign Application Priority Data

Jan. 22, 2002 (JP) ........................................ 2002-012785

(51) Int. Cl.[7] .............................. B05D 3/02; B05D 1/36; C08K 3/34
(52) U.S. Cl. ................................ 427/407.1; 427/385.5; 427/458; 524/449
(58) Field of Search ......................... 427/407.1, 385.5, 427/458; 524/449

(56) References Cited

U.S. PATENT DOCUMENTS

| | | | |
|---|---|---|---|
| 5,356,987 A | 10/1994 | Stephenson | 524/512 |
| 5,552,227 A | 9/1996 | Göldner | 428/423.1 |
| 5,667,847 A | 9/1997 | Muller et al. | 427/385.5 |
| 5,880,209 A | 3/1999 | Patzschke et al. | 524/591 |
| 6,552,117 B2 * | 4/2003 | Moos et al. | 524/504 |

OTHER PUBLICATIONS

Patent Abstracts of Japan, vol. 018, No. 651, (C–1285), Dec. 9, 1994 & JP 06 254482 A (Toyota Motor Corp.), Sep. 13, 1994.

Patent Abstracts of Japan, vol. 018, No. 656, (C–1286), Dec. 13, 1994 & JP 06 256714 A (Kansai Paint Co., Ltd.), Sep. 13, 1994.

* cited by examiner

*Primary Examiner*—Elena Tsoy
(74) *Attorney, Agent, or Firm*—Wenderoth, Lind & Ponack, L.L.P.

(57) ABSTRACT

A method for forming a coated film comprising the steps of sequentially applying an intermediate coating material, a base coating material and a clear coating material on a substrate on which an electrodeposition coated film has been formed; and simultaneously curing the applied three layers by baking, wherein the intermediate coating material comprises: (a) 40 to 56% by weight of an urethane modified polyester resin, the urethane modified polyester resin being obtainable by polyaddition of: a hydroxyl group containing polyester resin which is obtainable by polycondensation of an acid ingredient including not less than 80% by mole of isophthalic acid with a polyhydric alcohol ingredient, with an aliphatic diisocyanate compound; (b) 10 to 30% by weight of a melamine resin; (c) 15 to 30% by weight of a blocked isocyanate compound; (d) 4 to 15% by weight of a nonaqueous dispersion resin having core-shell structure; and (e) 0.4 to 2 parts by weight of a flake-like pigment. The resulting layered coated film is superior in aesthetic appearance and chipping resistance even formed in the three-coating and one-baking method.

12 Claims, No Drawings

METHOD FOR FORMING COATED FILM AND INTERMEDIATE COATING MATERIAL

BACKGROUND OF THE INVENTION

1. Field of the Invention

The present invention relates to a method and an intermediate coating material for forming a layered coated film on an automobile body or the like.

2. Description of the Related Art

As a method for forming a layered coated film on an automobile body, there are known some methods. In one method, coated layers are applied and cured by baking one by one, while in another method, plural coated layers are applied and thereafter they are cured simultaneously. For example, the two-coating and one-baking method is usually conducted for forming a metallic coated film. In addition, in order to improve aesthetic appearance of a top coated film, a method in which a color base coated layer, a metallic base coated layer and a clear coated layer are applied sequentially, and the three layers are cured by baking simultaneously, is also disclosed in Japanese Patent Kokai Publication No. H11(1999)-114489.

On the other hand, small stones are chipped up and hit to a coated film while automobiles are running. This so called "chipping" often peels a coated film from an automobile body. In the conventional method for forming a coated film, the intermediate coated layer was at once cured after being formed on an undercoated film. Thus, it was possible to reinforce chipping resistance of the coated film by, for example, providing an intermediate coated layer specialized to have chipping resistance, or providing an intermediate coated layer modified to have brightness similar to that of a top coated layer so as to make the chipped mark inconspicuous.

For example, in Japanese Patent Kokai Publication No. H6(1994)-256714 or in Japanese Patent Kokai Publication No. H6(1994)-254482, an effort has been made to improve chipping resistance of the intermediate coated film by modifying formulation of a coating material. However, the intermediate coating material does not provide satisfactory appearance and performance when they are employed in the method of simultaneously curing three layers by one-baking.

When three coated layers are formed in the wet-on-wet manner and are cured simultaneously by baking as described above, a baking oven for an intermediate coated layer can be omitted, and therefore great effect is expected economically and environmentally. However, the entire surface of an automobile having considerable concavo-convexes, and when it is coated in the wet-on-wet manner, defects in appearance such as popping and bleeding may occur in some regions.

SUMMARY OF THE INVENTION

It is an objective of the present invention to provide a method and an intermediate coating material for forming a layered coated film capable of controlling bleeding and inversion on an interface between each coated layer when an intermediate coating material, a base coating material and a clear coating material are applied sequentially in the wet-on-wet manner on a substrate, as well as capable of decreasing separation from the electrodeposition coated surface due to chipping or reducing the size of the peeled portions.

The present invention provides a method for forming a coated film comprising the steps of sequentially applying an intermediate coating material, a base coating material and a clear coating material on a substrate on which an electrodeposition coated film has been formed; and simultaneously curing the applied three layers by baking, wherein the intermediate coating material comprises:

(a) 40 to 56% by weight of an urethane modified polyester resin having a number average molecular weight of 1,500 to 3,000, the urethane modified polyester resin being obtainable by polyaddition of:

a hydroxyl group containing polyester resin having a glass transition point (Tg) of 40 to 80° C. which is obtainable by polycondensation of an acid ingredient including not less than 80% by mole of isophthalic acid with a polyhydric alcohol ingredient, with an aliphatic diisocyanate compound;

(b) 10 to 30% by weight of a melamine resin;

(c) 15 to 30% by weight of a blocked isocyanate compound, the blocked isocyanate compound being obtainable by blocking hexamethylene diisocyanate or an isocyanate compound derived from hexamethylene diisocyanate, with a compound having an active methylene group;

(d) 4 to 15% by weight of a nonaqueous dispersion resin having core-shell structure, provided that percentages of (a) to (d) are based on the solid weight of the coating material resin; and (e) 0.4 to 2 parts by weight of a flake-like pigment having a longitudinal size of 1 to 10 $\mu$m and a number average particle size of 2 to 6 $\mu$m, provided that the solid weight of the coating material resin is regarded as 100 parts.

The present invention further provides an intermediate coating material comprising said ingredients (a) to (e), for use in said method for forming a coated film.

As follows, the present invention will be described further in detail.

DETAILED DESCRIPTION OF THE INVENTION

Intermediate Coated Layer

In the present method for forming a coated film, an intermediate coating material is employed for formation of an intermediate coated layer. The intermediate coating material contains an urethane modified polyester resin (a), a melamine resin (b), a blocked isocyanate compound (c), a nonaqueous dispersion resin having core-shell structure (d), and a flake-like pigment (e). The intermediate coating material may further contain a variety of organic or inorganic color pigments and extender pigments and so on.

As the urethane modified polyester resin (a), those which has a number average molecular weight of 1,500 to 3,000 obtainable by reacting a hydroxyl group containing polyester resin with an aliphatic diisocyanate compound can be exemplified.

The urethane modified polyester resin (a) is contained in an amount of 40 to 56% by weight based on the solid weight of the coating material resin. If the amount is less than 40% by weight, chipping resistance of the coated film may become insufficient, whereas if more than 56% by weight, hardness of the coated film may decrease. Preferably, the amount is 43 to 50% by weight.

The urethane modified polyester resin (a) has a number average molecular weight of 1,500 to 3,000, preferably 1,200 to 2,500. If the number average molecular weight is less than 1,500, workability and curability of the coating material may become insufficient, whereas if more than 3,000, nonvolatile content becomes too low, may result in poor workability. In the present specification, a molecular weight is the value determined by means of the GPC method employing polystyrene as a standard.

The urethane modified polyester resin has a hydroxyl value of preferably 30 to 180, more preferably 40 to 160. If the hydroxyl value is more than the upper limit, water resistance of the coated film may deteriorate, whereas if less than the lower limit, curability of the coated layer may deteriorate. The urethane modified polyester resin has an acid value of preferably 3 to 30 mg KOH/g, more preferably 5 to 25 mg KOH/g. If the acid value is more than the upper limit, water resistance of the coated film may deteriorate, whereas if less than the lower limit, curability of the coated layer may deteriorate.

In general, a polyester resin can be produced by conducting the polycondensation reaction between an acid ingredient such as polyvalent carboxylic acid and/or acid anhydride with polyhydric alcohol. In preparation of the hydroxyl group containing polyester resin employed in the present invention, the acid ingredient comprises not less than 80% by mole of isophthalic acid based on the total molar amount of the acid ingredient. When the amount of the isophthalic acid is less than 80% by mole, glass transition point (Tg) of the hydroxyl group containing polyester resin may become too low.

The hydroxyl group containing polyester resin has a glass transition point (Tg) of 40 to 80° C., preferably 45 to 75° C. If the glass transition point (Tg) is less than the lower limit, hardness of the coated film may deteriorate, whereas if more than the upper limit, chipping resistance of the coated film may deteriorate.

Examples of the polyvalent carboxylic acid and/or acid anhydride other than the isophthalic acid include, but are not limited to, phthalic acid, phthalic anhydride, tetrahydrophthalic acid, tetrahydrophthalic anhydride, hexahydrophthalic acid, hexahydrophthalic anhydride, methyltetrahydrophthalic acid, methyltetrahydrophthalic anhydride, hymic anhydride, trimellitic acid, trimellitic anhydride, pyromellitic acid, pyromellitic anhydride, terephthalic acid, maleic acid, maleic anhydride, fumaric acid, itaconic acid, adipic acid, azelaic acid, sebacic acid, succinic acid, succinic anhydride, dodecenyl succinic acid and dodecenyl succinic anhydride.

Examples of the polyhydric alcohol include, but are not limited to, ethylene glycol, diethylene glycol, polyethylene glycol, propylene glycol, dipropylene glycol, polypropylene glycol, neopentyl glycol, 1,2-butane diol, 1,3-butane diol, 1,4-butane diol, 2,3-butane diol, 1,5-pentane diol, 1,6-hexane diol, 1,4-cyclohexane diol, 2,2-dimethyl-3-hydroxypropyl-2,2-dimethyl-3-hydroxypropionate, 2,2,4-trimethyl-1,3-pentane diol, polytetramethylene ether glycol, polycaprolactone polyol, glycerin, sorbitol, annitol, trimethylolethane, trimethylolpropane, trimethylolbutane, hexane triol, pentaerythritol and dipentaerythritol.

In addition to the aforementioned polyvalent carboxylic acids and/or acid anhydrides and polyhydric alcohols, monocarboxylic acids, hydroxycarboxylic acids, lactones and the like may be employed for the polycondensation reaction. Drying oils, semidrying oils and their fatty acids may also be employed. Concrete examples of which include monoepoxide compounds such as Cardura E (manufactured by Shell Chemical Co.) and lactones. The lactones mentioned above are capable of undergoing ring-opening addition with polyesters of polycarboxylic acids and polyhydric alcohols to form a graft chain and include but are not limited to β-propiolactone, dimethylpropiolactone, butyrolactone, γ-valerolactone, ε-caprolactone, γ-caprolactone, γ-caprylactone, crotolactone, δ-valerolactone and δ-caprolactone. The most preferred of these is ε-caprolactone.

Examples of the aliphatic diisocyanate compound include hexamethylene diisocyanate, trimethylhexamethylene diisocyanate, cyclohexane 1,4-diisocyanate, dicyclohexylmethane 4,4-diisocyanate, methylcyclohexane diisocyanate and the like. Among these, hexamethylene diisocyanate, trimethylhexamethylene diisocyanate and their biuret compounds, isocyanurate compounds and adduct compounds are preferred from the view points of chipping resistance and weather resistance properties.

The melamine resin (b) is contained in an amount of 10 to 30% by weight based on solid weight of the coating material resin. If the amount is less than 10% by weight, curability of the coating material may become insufficient, whereas if more than 30% by weight, the cured film may become so hard to be brittle. Preferably, the amount is 15 to 25% by weight.

Examples of the melamine resin include, but are not limited to, methylated melamine resins, butylated melamine resins and methyl butyl combined type melamine resins. For example, "CYMEL 303", "CYMEL 254", "U-VAN 128", "U-VAN 20N60" which are commercially available from Mitsui Toatsu K.K. and "SUMIMAL SERIES" which are commercially available from Sumitomo Kagaku K.K. can be recited.

The blocked isocyanate compound (c) means those which are obtainable by adding a blocking agent to a polyisocyanate, and when they are heated, the blocking agent dissociates from the polyisocyanate and an isocyanurate group is regenerated to react with a functional group in the urethane modified polyester resin to cure the same. Preferred examples of the blocking agent include a compound having an active methylene group, for example, acetyl acetone, ethyl acetoacetate and ethyl malonate. Preferred examples of the polyisocyanate include hexamethylene diisocyanate, its biuret compounds, its isocyanurate compounds, and its adduct compounds.

The blocked isocyanate compound (c) is contained in an amount of preferably 15 to 30% by weight, more preferably 17 to 25% by weight based on the solid weight of the coating material resin. If the amount is outside of the range, curing property of the coating material may become insufficient.

Concrete examples of the blocked isocyanate compound include active methylene type blocked isocyanate "DURANATE MF-K60X" available from Asahi Kasei K.K.

The nonaqueous dispersion resin having core-shell structure (d) includes those which are obtainable by conducting polymerization of polymerizable monomers in a mixture of a dispersion-stabilizing resin and an organic solvent, and they are in the form of non-crosslinked resin particles insoluble to this mixture. The monomers to be copolymerized are not particularly restricted insofar as they are radically polymerizable unsaturated monomers.

However, in synthesizing the dispersion-stabilizing resin and the nonaqueous dispersion, it is preferred to employ polymerizable monomers having a functional group. This is because a nonaqueous dispersion having a functional group can react with a curing agent which will be described later together with the dispersion-stabilizing resin having a functional group to form a three-dimensionally crosslinked coated film.

The nonaqueous dispersion resin (d) is contained in an amount of 4 to 15% by weight based on the solid weight of the coating material resin. If the amount is less than 4% by weight, general appearance of the coated film may become poor, whereas if more than 15% by weight, chipping resistance may deteriorate. Preferably, the amount is 5 to 12% by weight.

The dispersion-stabilizing resin is not particularly restricted insofar as it allows to generate the nonaqueous dispersion stably in an organic solvent. Examples of the dispersion-stabilizing resin include acrylic resins, polyester resins, polyether resins, polycarbonate resins, polyurethane resins and the like which have a hydroxyl value of 10 to 250, preferably 20 to 180, an acid value of 0 to 100 mg KOH/g, preferably 0 to 50 mg KOH/g, a number average molecular weight of 800 to 100,000, preferably 1,000 to 20,000. If the characteristic values are more than the upper limits, handling properties of the resin may deteriorate, and handling properties of the nonaqueous dispersion also may deteriorate. If the characteristic values are less than the lower limits, a resin may come off from the resulting coated film or stability of the particles may deteriorate.

A method for synthesizing the dispersion-stabilizing resin is not particularly limited, however, a method by radical polymerization in the presence of a radical polymerization initiator and a method by condensation reaction or addition reaction are exemplified as a preferred method. Monomers for obtaining the dispersion-stabilizing resin are appropriately selected dependent on properties of the resin. The monomers preferably have a functional group, which the polymerizable monomers employed for synthesizing nonaqueous dispersion as will be described later, such as a hydroxyl group and an acid group, and optionally a functional group such as a glycidyl group, an isocyanate group and the like.

The dispersion-stabilizing resin is combined with the polymerizable monomers in an appropriate ratio dependent on the purpose. For example, it is preferred that the dispersion-stabilizing resin accounts for 3 to 80% by weight, particularly 5 to 60% by weight based on the total weight of the two ingredients, and the polymerizable monomers account for 97 to 20% by weight, particularly 95 to 40% by weight. The mixture of the dispersion-stabilizing resin and the polymerizable monomers is further combined with an organic solvent. In that case, the total weight of the mixture accounts for preferably 30 to 80% by weight, more particularly 40 to 60% by weight.

The nonaqueous dispersion resin is obtainable by polymerizing the radically polymerizable monomers in the presence of the dispersion-stabilizing resin. The resulting nonaqueous dispersion has a hydroxyl value of preferably 50 to 400, more preferably 100 to 300, an acid value of preferably 0 to 200 mg KOH/g, more preferably 0 to 50 mg KOH/g, a mean particle size ($D_{50}$) of preferably 0.05 to 10 $\mu$m, more preferably 0.1 to 2 $\mu$m. If the characteristic values are less than the lower limits, particle shape cannot be maintained, whereas if more than the upper limits, stability may decrease when it is dispersed in a coating material.

In synthesizing the nonaqueous dispersion resin, a polymerizable monomer having a functional group and a radically polymerizable monomer having no functional group may be employed. Typical examples of the polymerizable monomers having a functional group include those having a hydroxyl group and those having an acidic group. Examples of the monomer having a hydroxyl group include hydroxyethyl (meth)acrylate, hydroxypropyl (meth)acrylate, hydroxybutyl (meth)acrylate, hydroxymethyl methacrylate, allyl alcohol and an adduct of hydroxyethyl methacrylate and $\epsilon$-caprolactone.

Examples of the monomer having an acidic group include polymerizable monomers having a carboxylic group, a sulfonic acid group and the like. Those having a carboxylic group include (meth)acrylic acid, crotonic acid, ethacrylic acid, propylacrylic acid, isopropylacrylic acid, itaconic acid, maleic anhydride, fumaric acid and the like. Those having a sulfonic acid group include t-butylacrylamide sulfonic acid and the like. When polymerizable monomers having an acidic group are employed, it is preferred that at least a part of the acidic group is a carboxylic group.

Further, examples of polymerizable monomers having a functional group include glycidyl group containing unsaturated monomers such as glycidyl (meth)acrylate and isocyanate group containing unsaturated monomers such as m-isopropenyl-$\alpha$, $\alpha$-dimethylbenzyl isocyanate and isocyanatoethyl acrylate.

Other examples of the polymerizable monomers include alkyl (meth)acrylates such as methyl (meth)acrylate, ethyl (meth)acrylate, isopropyl (meth)acrylate, n-propyl (meth) acrylate, n-butyl (meth)acrylate, t-butyl (meth)acrylate, isobutyl (meth)acrylate, 2-ethylhexyl (meth)acrylate, n-octyl (meth)acrylate, lauryl (meth)acrylate, stearyl (meth) acrylate and tridecyl (meth)acrylate; addition reactants of fatty acids and acrylate or methacrylate monomers having oxirane structure (for example, an addition reactant of stearic acid and glycidyl methacrylate or the like); addition reactants of oxirane compounds having an alkyl group of $C_3$ or more and acrylic acid or methacrylic acid; styrene, $\alpha$-methylstyrene, p-methylstyrene, m-methylstyrene, p-methylstyrene, p-t-butylstyrene, benzyl (meth)acrylate, itaconate esters (such as dimethyl itaconate), maleate esters (such as dimethyl maleate), fumarate esters (such as dimethyl fumarate), as well as acrylonitrile, methacrylonitrile, methylisopropenyl ketone, vinyl acetate, VEOVA monomer (trade name, manufactured by Shell Chemical Co.), vinyl propionate, vinyl pivalate, ethylene, propylene, butadiene, N,N-dimethylaminoethyl acrylate, N,N-dimethylaminoethyl methacrylate, acrylamide, vinyl pyridine and the like.

Polymerization reaction for obtaining the nonaqueous dispersion is preferably conducted in the presence of a radical polymerization initiator. Examples of the radical polymerization initiator include azoic initiators such as 2,2'-azobisisobutyronitrile and 2,2'-azobis(2,4-dimethylvaleronitrile); benzoyl peroxide, lauryl peroxide, t-butyl peroctoate and the like. It is desired that the using amount of these initiators is 0.2 to 10 parts by weight, preferably 0.5 to 5 parts by weight with respect to 100 parts by weight of total polymerizable monomers. It is preferred that polymerization reaction for obtaining the nonaqueous dispersion in the organic solvent containing the dispersion-stabilizing resin is conducted at a temperature in a range of generally 60 to 160° C. for about 1 to 15 hour(s).

The particles of the nonaqueous dispersion are not crosslinked internally. Therefore, they easily deform to become shapeless upon heating, for example, during a baking step of the intermediate coated layer. That is, the nonaqueous dispersion has particle shape in the intermediate coating material, or in the intermediate coated layer, but it melts during the baking step to be integrated with a resin of the coated layer. As a result, the nonaqueous dispersion does not keep its particle shape in the coated film. This is a point of that the nonaqueous dispersion is different from crosslinked polymer particles.

Furthermore, resin particles called NAD (Non-Aqueous Dispersion, or Nonaqueous Polymer Dispersion Liquid) employed in the NAD paint which is described, for example, in "Color Material, vol. 48, pages 28 to 34 (1975)" may be employed.

As the flake-like pigment (e), mica, alumina, talc, silica and the like can be employed. However, talc is preferred from the view point of chipping resistance.

The flake-like pigment preferably have a longitudinal size of 1 to 10 $\mu$m and a number average particle size of 2 to 6 $\mu$m. If the longitudinal size is outside of the range, appearance of the coated film may become poor or chipping resistance may become insufficient. If the number average particle size is outside the range, also appearance of the coated film may become poor or chipping resistance may become insufficient.

The flake-like pigment (e) is contained in an amount of preferably 0.4 to 2 parts by weight based on 100 parts of the solid weight of the coating material resin. More preferably, the amount is 0.5 to 1.5 parts by weight. If the amount is outside the ranges, chipping resistance of the coated film may become insufficient since adhesion to an undercoated film decreases.

Other resins which may be contained include, but are not limited to, acrylic resins, polyester resins, alkyd resins, epoxy resins and the like, and one or more kinds of such resins may be employed.

As color pigments, there may be employed, for example, organic ones such as azo chelate pigments, insoluble azo pigments, condensed azo pigments, phthalocyanine pigments, indigo pigments, perinone pigments, perylene pigments, dioxane pigments, quinacridone pigments, isoindolinone pigments and metal complex pigments, and inorganic ones such as chrome yellow, yellow iron oxide, red iron oxide, carbon black and titanium dioxide. As extender pigments, there may be employed calcium carbonate, barium sulfate, aluminum powder, kaolin and the like.

In general, a gray color prepared by using carbon black and titanium dioxide as main pigments is employed. However, various color pigments may be employed to provide various colors for example that having a hue similar to that of a top coated layer.

To the intermediate coating material, a viscosity modifier may be added for preventing bleeding with the top coated film or for obtaining good workability. A compound which shows thixotropic properties can generally be employed as viscosity modifier, for example, polyamides such as swollen dispersion of fatty acid amides, fatty acid amides, long-chain polyaminoamide phosphate salts; polyethylenes such as colloidal swollen dispersion of polyethylene oxide; organic bentonites such as organic acid smectite clay, montmorillonite; inorganic pigments such as aluminum silicate and barium sulfate; flake-like pigments causing viscosity depending on their shape; and crosslinked resin particles.

The intermediate coating material employed in the present invention has a total solid content of 30 to 80% by weight, preferably 35 to 65% by weight at the time of application. If the solid content is outside of the ranges, stability of the coating material may deteriorate. If it is more than the upper limit, viscosity of the coating material becomes too high, and appearance of the coated film may become poor. If it is less than the lower limit, viscosity of the coating material becomes too low and defects in appearance such as bleeding and unevenness may appear.

The intermediate coating material may include, in addition to the above ingredients, one or more additives usually added to coating materials, for example surface adjusters, antioxidants, antifoaming agents and so on. The blending amount of these are the range usually known to those skilled in the art.

The coating material employed in the present invention, which includes those will be described later, may be prepared by any method well known to those in the art. For example, a method of kneading and dispersing ingredients to be blended such as a pigment and the like by a kneader, a roll mill, a SG mill or the like, can be employed.

Base Coated Layer

In a method for forming a coated film according to the present invention, a base coating material is employed for forming a base coated layer. The base coated layer forms a top coated film together with a clear coated layer which will be described later. This base coating material contains a film formable resin, a curing agent, a color pigment and optionally a luster color pigment.

Examples of the film formable resin contained in the base coating material include, but are not limited to, acrylic resins, polyester resins, alkyd resins, epoxy resins, urethane resins and the like, and resins may be employed alone or in combination.

The film formable resin can be employed in combination with a curing agent. Examples of the preferred curing agent include amino resins and/or blocked isocyanate resins from the view point of various performances of the resulting coated film and costs.

The curing agent is included in an amount of 20 to 60% by weight, more preferably 30 to 50% by weight based on the solid weight of the film formable resin. If the content is less than 20% by weight, curability may become insufficient, whereas if more than 60% by weight, the cured film may become too hard to be brittle.

The color pigment be those described in the description for the intermediate coating material.

The luster color pigment which may optionally be contained in the above mentioned base coating material is not particularly restricted in shape and it may be colored. Preferably, it has a mean particle size ($D_{50}$) of 2 to 50 μm and a thickness of 0.1 to 5 μm. Those having a mean particle size of within the range of 10 to 35 μm are excellent in brilliantness, and are preferred. Generally, the luster color pigment is contained in the above coating material in a concentration (PWC) of preferably not more than 20.0%. If PWC is more than the upper limit, appearance of the coated film may become poor. PWC is preferably 0.01% to 18.0%, and more preferably 0.1% to 15.0%.

As the luster color pigment, there may be employed colorless or colored metallic luster color agents, such as metals like aluminum, copper, zinc, iron, nickel, tin, aluminum oxide or alloys and mixtures thereof. Further, interfering mica pigments, white mica pigments, graphite pigments, other tinct or colored flake-like pigments and so on may be employed in combination.

The base coating material has a PWC, inclusive of the above luster color pigment and all other pigments, of 0.1% to 50%, preferably 0.5% to 40%, more preferably 1.0% to 30%. If PWC is more than the upper limit, appearance of the coated film may become poor.

To the base coating material, a viscosity modifier preferably is added for obtaining good workability, similar to the intermediate coating material. The viscosity modifier is employed for preventing unevenness or sag from generating on a coated film. A compound which shows thixotropic properties can generally be employed as a viscosity modifier. For example, those which are recited in the description of the intermediate coating material can be employed.

The base coating material may include, in addition to the above ingredients, one or more additives usually added to coating materials, for example surface adjusters, thickeners, antioxidants, ultraviolet absorbers, antifoaming agents and so on. The blending amount of these are the range usually known to those skilled in the art.

The base coating material has a total solid content of 10 to 60% by weight, preferably 15 to 50% by weight at the time of application. If the solid content is outside of the ranges, stability of the coating material may deteriorate. If it is more than the upper limit, viscosity of the coating material may become too high and appearance of the coated film may become poor. If it is less than the lower limit, viscosity of the coating material may become too low and defects in appearance such as bleeding and unevenness may appear.

Clear Coated Layer

For forming the clear coated layer, a clear coating material is employed. The clear coating material is not particularly restricted and may be a clear coating material which contains a film formable thermocurable resin, a curing agent and the like. The clear coating material may be a solvent type, a water-borne type and a powder type.

Preferred examples of the clear coating material of the solvent type include, from the viewpoint of transparency or resistance to acid etching, a combination of an acrylic resin and/or polyester resin and an amino resin; or an acrylic resin and/or a polyester resin having carboxylic acid-epoxy curing system.

Examples of the water-borne clear coating material include those which contain the film formable resin of the solvent type clear coating material with being neutralized by using base to be made aqueous. The neutralization may be conducted, before or after polymerization, by adding a tertiary amine such as dimethyl ethanolamine or triethylamine.

Ordinary powder coating materials such as a thermoplastic or a thermosetting powder coating material may also be employed. For obtaining a coated film with good physical properties, a thermosetting powder coating material is preferred. Typical examples of the thermosetting powder coating material include epoxy, acrylic and polyester-based powder clear coating materials. An acrylic powder clear coating material is particularly preferred because of their good weathering resistance.

A powder coating material of epoxy-containing acrylic resin/polycarboxylic acid type is particularly preferred. This is because no vapor is generated on curing, good appearance is provided, and yellowing of the coated film is small.

To the clear coating material, a viscosity modifier preferably is added for obtaining good workability, similar to the intermediate coating material. A compound which shows thixotropic properties can generally be employed as a viscosity modifier. For example, those which are recited in the description of the intermediate coating material can be employed. The clear coating material may optionally contain a curing catalyst or surface adjuster.

Substrate

The method for forming a coated film of the present invention may be applied to various substrates such as metals, plastics and foamed bodies, preferably to metal surfaces and moldings, and more preferably to metal products on which cationic electrodeposition coated film has been formed.

Examples of the metal products include iron, copper, aluminum, tin, zinc and the like and alloys containing these metals. Specific products include bodies and parts of automobiles such as passenger cars, trucks, motorcycles and buses. These metal substrates are particularly preferred that they are preliminarily subjected to forming treatment with phosphate salt, chromate salt or the like.

The substrate may have an electrodeposition coated film on the surface subjected to forming treatment. The electrodeposition coated film may be formed from an anionic or a cationic electrodeposition coating material. However, a cationic electrodeposition coating material is preferred since it provides excellent corrosion resistance.

Method for Forming Coated Film

According to the method for forming a coated film of the present invention, an intermediate coated layer is formed on a substrate using the intermediate coating material, then a base coated layer is formed using the base coating material and a clear coated layer is formed using the clear coating material in this order in the wet-on-wet manner.

When the intermediate coating material is applied to automotive bodies according to the present invention, multistage coating method with using air-electrostatic spray coating, preferably two-stage may be conducted. Otherwise a coating method of air-electrostatic spray coating combined with a rotary atomizing air-electrostatic coating machine such as what we call "$\mu\mu$ (micromicro) bell", "$\mu$ (micro) bell" or "metabell" may be conducted.

The intermediate coating material forms a dry coated layer having a thickness of usually 10 to 60 $\mu$m, but it may vary according to the intended use. If the thickness is more than the upper limit, image sharpness may deteriorate or a trouble such as unevenness or sugging may occur at the time of application. If it is less than the lower limit, the substrate cannot be hidden, and film discontinuity may occur.

On the uncured intermediate coated layer, a base coating material and a clear coating material are applied in the wet-on-wet manner to form a base coated layer and a clear coated layer.

The base coating material may be applied, like the intermediate coating material, with using air-electrostatic spray coating or a rotary atomizing electrostatic coating machine such as the metabell, the $\mu\mu$ bell or the $\mu$ bell so as to have a dry thickness of 5 to 35 $\mu$m, preferably 7 to 25 $\mu$m. If the dry thickness of the coated layer is more than 35 $\mu$m, sharp-appearance property may deteriorate, or unevenness or sugging may occur in the coated film, whereas if less than 5 $\mu$m, the substrate cannot be hidden, and film discontinuity (discontinuous state of coated film) may occur. Therefore, both of which are not preferred.

The clear coated material is then applied on the base coated layer, for the purpose of smoothing roughness or glittering which occurs due to the presence of luster color pigment and for protecting a surface of the base coated layer. The clear coated material may be applied, like the base coating material, with using the rotary atomizing electrostatic coating machine such as the $\mu\mu$ bell or the $\mu$ bell.

The clear coated layer is preferably formed so as to have a dry thickness of about 10 to 80 $\mu$m, more preferably about 20 to 60 $\mu$m. If it is more than the upper limit, troubles such as foaming or sagging may occur at the time of application. If below the lower limit, roughness of the base coated surface cannot be hidden.

The layered coated layer obtained as described above are cured simultaneously to form a layered coated film. This is what we call "three-coating one-baking method." This method requires no oven for drying the intermediate coated layer and the base coated layer, and is favorable from the economical and the environmental viewpoint.

The layered coated layer is cured in a curing temperature within the range of 100 to 180° C., preferably 130 to 160° C., so as to obtain a cured coated film with high crosslinking density. If the curing temperature is more than the upper limit, the coated film may become hard and brittle. If less than the lower limit, degree of curing may become insufficient. The curing time may vary depending on the curing temperature, however, a curing time of 10 to 30 minutes is adequate when the curing temperature is 130° C. to 160° C.

According to the process of the present invention, the layered coated film is formed so as to have a thickness of 30 to 300 $\mu$m, preferably 50 to 250 $\mu$m. When it is more than the upper limit, the coated film may become poor in physical properties when heating and cooling cycles are applied. If less than the lower limit, strength of the coated film itself may decrease.

The following examples further illustrate the present invention, however, these are not to be construed as limiting the present invention to their details. In the examples, the wordings "part(s)" are those based on weight unless otherwise indicated.

EXAMPLES

Production Examples

Production of Urethane Modified Polyester Resin

A two-liter reaction vessel equipped with a nitrogen inlet tube, stirrer, temperature controller, dropping funnel and condenser with decanter was charged with 440 parts of isophthalic acid, 20 parts of hexahydrophthalic acid, 40 parts of azelaic acid, 300 parts of trimethylolpropane and 200 parts of neopentyl glycol and heated. When the raw materials had dissolved, 0.2 parts of dibutyl tin oxide was added and stirring was started. The reactant was gradually heated from 180 to 220° C. over 3 hours. Condensed water generated was distilled out of the system. When it reached 220° C., the reactant was held for 1 hour, and 20 parts of xylene was gradually added for further allowing the condensation reaction to proceed in the presence of a solvent. When the acid value reached 10 mg KOH/g, the reactant was cooled to 100° C., and 100 parts of hexamethylene diisocyanate was gradually added over 30 minutes. After holding for 1 hour, 200 parts of xylene and 200 parts of butyl acetate were added to this to obtain an urethane modified polyester resin which has a solid content of 70%, a number average molecular weight of 2,000, an acid value of 8 mg KOH/g, a hydroxyl value of 120 and a resin Tg of 60° C.

Production of Acrylic Resin

A one-liter reaction vessel equipped with a nitrogen inlet tube, stirrer, temperature controller, dropping funnel and condenser with decanter was charged with 82 parts of xylene and was heated to 110° C. Next, 20 parts of a solution prepared by mixing up 4.5 parts of methacrylic acid, 26.0 parts of ethyl acrylate, 64.5 parts of PLACCEL FM-1 (hydroxyl group containing monomer, manufactured by Daicel Chemical Industries. Ltd.), 5.0 parts of MSD-100 (methylstyrene dimer, manufactured by Mitsui Toatsu K.K.) and 13.0 parts of azobisisobutyronitrile, was added dropwise with stirring.

The remaining 93.0 parts of the above mixed monomer solution was added dropwise over 3 hours under dry distillation. Next, after dropping a solution composed of 1.0 part of azobisisobutyronitrile and 12 parts of xylene over 30 minutes, the reactant was held at 110° C. for 1 hour. Next, 63 parts of solvent was distilled out under reduced pressure, to obtain an acrylic resin which has a solid content of 75% and a number average molecular weight of 2,000.

Production of Nonaqueous Dispersion (a) Production of Dispersion-Stabilizing Resin A vessel equipped with a stirrer, temperature controller and reflux condenser was charged with 90 parts of butyl acetate. Next, 20 parts of a solution having a composition as shown in Table 1 below was added to this, and the reactant was heated.

TABLE 1

| Methyl methacrylate | 38.9 parts |
| Stearyl methacrylate | 38.8 parts |
| 2-hydroxyethyl acrylate | 22.3 parts |
| Azobisisobutyronitrile | 5.0 parts |

The remaining 85 parts of the above mixed solution was added dropwise at 110° C. over 3 hours, and then a solution made up of 0.5 parts of azobisisobutyronitrile and 10 parts of butyl acetate was added dropwise over 30 minutes. The reaction solution was refluxed with stirring for 2 hours so as to proceed conversion to the resin. Then the reaction was stopped to obtain an acrylic resin which has a solid content of 50%, a number average molecular weight of 5,600 and an SP value of 9.5.

(b) Production of Nonaqueous Dispersion

A vessel equipped with a stirrer, condenser and temperature controller was charged with 90 parts of butyl acetate and 60 parts of the acrylic resin obtained in the production step of dispersion-stabilizing resin (a). Next, a solution having a composition as shown in Table 2 below was added dropwise at 100° C. over 3 hours.

TABLE 2

| Styrene | 7.0 parts |
| Methacrylic acid | 1.8 parts |
| Methyl methacrylate | 12.0 parts |
| Ethyl acrylate | 8.5 parts |
| 2-hydroxyethyl acrylate | 40.7 parts |
| Azobisisobutyronitrile | 1.4 parts |

Then a solution made up of 0.1 part of azobisisobutyronitrile and 1 part of butyl acetate was added dropwise over 30 minutes. The reaction solution was stirred for another 1 hour to obtain an emulsion having a solid content of 60% and a particle size of 180 nm. This emulsion was diluted with butyl acetate to obtain a core-shell type butyl acetate dispersion containing 40% by weight of a nonaqueous dispersion which has a viscosity of 300 cps (25° C.) and a particle size of 180 nm. This nonaqueous dispersion resin had a Tg of 23° C., a hydroxyl value of 162, an SP value of 11.8 and a difference of SP value between the core part and the shell part which is dispersion-stabilizing resin was 2.3.

Example 1

Intermediate Coating Material 1

A one-litter vessel was charged with 107 parts of the urethane modified polyester resin varnish obtained in the production example described above, 280 parts of CR-97 (titanium oxide, manufactured by Ishihara Sangyo K.K.), 13 parts of MA-100 (carbon black pigment, manufactured by Mitsubishi Kagaku K.K.), 7 parts of LMS-100 (scale-form talc, manufactured by Fuji Talc K.K.), 47 parts of butyl acetate and 47 parts of xylene, and an amount equal to the charged weight of GB503M (glass beads having a particle size of 1.6 mm) was introduced. This was allowed to disperse for 3 hours at room temperature using a desk-top SG mill, to give a gray pigment paste. Particle size at the time when the dispersing is completed was measured by a grained gauge to be not more than 5 µm. Glass beads were filtered off to obtain a pigment paste. Using this pigment paste, an intermediate coating material having composition shown in Table 5 was prepared. The intermediate coating material was then diluted with a mixed solvent of ethoxyethyl propionate/S-100 (aromatic hydrocarbon solvent, manufactured by Exxon Corporation)=1/1 so as to be a viscosity of 19 seconds at 20° C. using the No.4 Ford cup. Nonvolatile content at the time of application was 49%.

Base Coating Material

An acryl melamine type metallic base coating material "ORGA TO H600 18J Green metallic" manufactured by Nippon Paint Co., Ltd. was diluted with a mixed solvent of ethoxyethyl propionate/S-100 (aromatic hydrocarbon solvent, manufactured by Exxon Corporation)/toluene=1/1/2 so as to be a viscosity of 17 seconds at 20° C. using the No.3 Ford cup. Nonvolatile content at the time of application was 31%. Nonvolatile content of the coated layer was 65%.

Clear Coating Material

An acid-epoxy curing type clear coating material "MAC O-1600 Clear" manufactured by Nippon Paint Co., Ltd. was diluted with a mixed solvent of ethoxyethyl propionate/S-100 (aromatic hydrocarbon solvent, manufactured by Exxon Corporation)=1/1 so as to be a viscosity of 26 seconds at 20° C. using the No.4 Ford cup. Nonvolatile content at the time of application was 50%. Nonvolatile content of the coated layer was 61%.

Method for Forming Coated Film

An SPC steel plate of 0.8 mm in thickness, 30 cm in length and 10 cm in width, was subjected with zinc phosphate treatment. A cationic electrodeposition coating material "POWER TOP V-20" manufactured by Nippon Paint Co., Ltd. was applied to this by electrodeposition coating so that dry film thickness was 20 µm, followed by baking at 160° C. for 30 minutes, to prepare a coating substrate. Next, the coating substrate was adhered to a movable body, and the above-described intermediate coating material was applied by means of the "micro bell" (rotary atomizing electrostatic coating machine) so that dry film thickness was 20 µm while moving. After an interval of 10 minutes, setting was carried out.

Next, the above-described base coating material was applied in two stages by means of the "micro bell" and the "meta bell" so that dry film thickness was 15 µm. Between the two applications, an interval of 2.5 minutes was provided. After these two applications, setting was carried out for 8 minutes. Next, the above-described clear coating material was applied in one stage by means of the "micro bell" so that dry film thickness was 35 µm, followed by 7 minutes setting. Then the resultant coated substrate was baked for 30 minutes at 140° C. in an oven.

For the resultant coated substrate, finished appearance of the coated film, especially glossy feeling was evaluated by eyes in accordance with an evaluation criteria as follows:

TABLE 3

<Criteria for determining glossy feeling>

| | |
|---|---|
| ○ | Excellent glossy feeling with thick appearance |
| x | No glossy feeling |

Furthermore, chipping resistance of the resultant coated substrate was evaluated in the following manner. Using a Grabello tester (manufactured by Suga Test Instruments), 300 pieces of No.7 crushed stones were hit against a coated film at an angle of 45° from a distance of 35 cm by an air pressure of 3.0 kgf/cm². After washing with water followed by drying, a peeling test was carried out using an industrial adhesive tape available from Nichiban Co., Ltd., and then degree of peeling of the coated film was observed by eyes for evaluation in terms of a diameter and a number of peeled portions.

Also, the intermediate coating material previously produced of which viscosity was adjusted, was allowed to stand for 10 days at 40° C. Then, the state of the coating material was observed by eyes and touching by fingers and evaluation was made in accordance with the following evaluation criteria.

TABLE 4

<Evaluation criteria for coating material state>

| | |
|---|---|
| ○ | No change |
| ○Δ | With precipitation but redispersible by stirring |
| Δ | With aggregation |
| x | Coating material is gelled |

The results are shown in Table 5.

Example 2

A layered coated film was prepared according to substantially the same manner as that described in Example 1, except that an intermediate coating material having a composition shown in Table 5 was used instead of intermediate coating material 1, and evaluated. The results are shown in Table 5.

Comparative Example 1

A layered coated film was prepared according to substantially the same manner as that described in Example 1, except that a pigment paste prepared from 100 parts of an acrylic resin varnish, 287 parts of CR-97, 13 parts of MA-100, 50.5 parts of butyl acetate and 50.5 parts of xylene, was employed instead of the pigment paste prepared by using the urethane modified polyester resin, and evaluated.

Comparative Example 2

A layered coated film was prepared according to substantially the same manner as that described in Example 1, except that a pigment paste prepared from 100 parts of acrylic resin varnish, 280 parts of CR-97, 13 parts of MA-100, 7 parts of LMS-300, 50.5 parts of butyl acetate and 50.5 parts of xylene, was employed instead of the pigment paste prepared by using the urethane modified polyester resin, and evaluated.

Comparative Example 3

A polyester melamine based intermediate coating material "Orga TO H870 gray" (manufactured by Nippon Paint Co., Ltd.) was employed instead of the intermediate coating material 1 of Example 1. This is the type of coating material to be cured in the form of single coated layer.

An intermediate coated layer was formed on a substrate according to the same manner as that described in Example 1. The coated layer was then cured by baking at 140° C. for 30 minutes. A base coated film and a clear coated film were formed thereon as that described in Example 1, and the resulting layered coated film was evaluated. Results of evaluation are shown in Table 5.

Comparative Example 4

A layered coated film was prepared according to substantially the same manner as that described in Example 1, except that "Orga TO H870 gray" was employed instead of the intermediate coating material 1, and evaluated. Results of evaluation are shown in Table 5.

TABLE 5

| | | Example | | Comparative Example | | | |
|---|---|---|---|---|---|---|---|
| | | 1 | 2 | 1 | 2 | 3 | 4 |
| Formulation of intermediate coating | Pigment paste | 100 | 100 | 100 | 100 | Orga TO H870 gray | Orga TO H870 gray |
| | Polyester resin | 130 | 63 | — | — | | |
| | Acrylic resin | — | — | 92 | 178 | | |
| | Non aq. dispersion | 53 | 19.5 | 160 | 53 | | |
| | U-Van 128 (melamine resin) | 71 | 37.1 | 107 | 71 | | |
| | Duranate MF-K60X (blocked isocyanate) | 71 | 37.1 | — | 71 | | |
| Solid ratio of resin | polyester resin | 50 | 53 | 0 | 0 | | |
| | acrylic resin | 0 | 0 | 40 | 50 | | |
| | non aqueous dispersion | 10 | 7 | 30 | 10 | | |
| | melamine resin | 20 | 20 | 30 | 20 | | |
| | blocked isocyanate | 20 | 20 | 0 | 20 | | |
| Pigment ratio | titanium oxide | 28 | 33 | 28 | 28 | | |
| | carbon black | 1.3 | 1.5 | 2.0 | 1.3 | | |
| | talc | 0.7 | 0.8 | 0 | 0.7 | | |
| PWC (%) | | 30 | 35 | 40 | 30 | | |
| Evaluation results | Finished appearance | ○ | ○ | ○ | ○ | ○ | x |
| | Chipping resistance Peeled diameter (mm) | 2 | 2 | 4 | 3 | 2.5 | 3.5 |
| | Peeled number (times) | 20 | 18 | 50 | 30 | 20 | 30 |
| | Storage stability (increase in viscosity) | ○ | ○ | ○Δ | x | ○ | ○ |

By using the intermediate coating materials of Example 1 and Example 2, excellent chipping resistance and satisfactory finished appearance were obtained on the three-coating and one-baking method of intermediate, metallic base and clear coatings.

According to examples of the present invention, it was possible to obtain a layered coated film which is superior in glossy feeling even when an intermediate coated layer, a base coated layer and a clear coated layer were sequentially formed in the wet-on-wet manner. Further, in the coating method of the present invention, chipping resistance may inferior by comparison with the coating method of three-coating and two-baking method since the baking is only once. However, a repulsive force to an impact at the time of chipping, as well as an ability to convert impact energy to heat energy are imparted to the coated film by employing a composition of intermediate coating material to those described above. Accordingly, it is considered that even when the obtained layered coated film experiences chipping, area and numbers of the peeled portions were small.

The method and the intermediate coating material of the invention can control interfacial bleeding or inversion between coated film layers when an intermediate coated film layer and a metallic coated film layer are sequentially formed. Thus, it is now possible to provide, on an industrial scale, a layered coated film having high physical property and high aesthetic appearance.

What is claimed is:

1. A method for forming a coated film comprising the steps of sequentially applying an intermediate coating material, a base coating material and a clear coating material on a substrate on which an electrodeposition coated film has been formed; and simultaneously curing the applied three layers by baking, wherein the intermediate coating material comprises:

(a) 40 to 56% by weight of an urethane modified polyester resin having a number average molecular weight of 1,500 to 3,000, the urethane modified polyester resin being obtained by polyaddition of:

a hydroxyl group containing polyester resin having a glass transition point (Tg) of 40 to 80° C. which is obtained by polycondensation of an acid ingredient including not less than 80% by mole of isophthalic acid with a polyhydric alcohol ingredient, with an aliphatic diisocyanate compound;

(b) 10 to 30% by weight of a melamine resin;

(c) 15 to 30% by weight of a blocked isocyanate compound, the blocked isocyanate compound being obtained by blocking hexamethylene diisocyanate or an isocyanate compound derived from hexamethylene diisocyanate, with a compound having an active methylene group;

(d) 4 to 15% by weight of a nonaqueous dispersion resin having core-shell stmcture, provided that percentages of (a) to (d) are based on the solid weight of coating material resin in the intermediate coating material; and (e) 0.4 to 2 parts by weight of a flake-like pigment having a longitudinal size of 1 to 10 $\mu$m and a number average particle size of 2 to 6 $\mu$m, provided that the solid weight of the coating material resin in the intermediate coating material is regarded as 100 parts.

2. The method according to claim 1, wherein the urethane modified polyester resin of ingredient (a) has a hydroxyl value of 30 to 180 and an acid value of 3 to 30 mg KOH/g.

3. The method according to claim 1, wherein the aliphatic diisocyanate compound of ingredient (a) is selected from the group consisting of hexamethylene diisocyanate, trimethylhexamethylene diisocyanate, their biuret compounds, their isocyanurate compounds and their adduct compounds.

4. The method according to claim 1, wherein the isocyanate compound derived from hexamethylene diisocyanate of ingredient (c) is selected from the group consisting of biuret compounds, isocyanurate compounds and adduct compounds of hexamethylene diisocyanate.

5. The method according to claim 1, wherein the compound having an active methylene group of ingredient (c) is selected from the group consisting of acetyl acetone, ethyl acetoacetate and ethyl malonate.

6. The method according to claim 1, wherein the nonaqueous dispersion resin (d) is obtained by polymerizing radically polymerizable monomers in a mixture of a dispersion-stabilizing resin and an organic solvent.

7. The method according to claim 6, wherein the radically polymerizable monomers are one or more selected from the group consisting of a radically polymerizable monomer having no functional group, a radically polymerizable monomer having a hydroxyl group and a radically polymerizable monomer having a carboxyl group.

8. The method according to claim 6, wherein the dispersion-stabilizing resin is selected from the group consisting of acrylic resins, polyester resins, polyether resins, polycarbonate resins and polyurethane resins which have a hydroxyl value of 10 to 250, an acid value of up to 100 mg KOH/g, a number average molecular weight of 800 to 100,000.

9. The method according to claim 6, wherein the nonaqueous dispersion resin (d) has a hydroxyl value of 50 to 400, an acid value of up to 200 mg KOH/g, a mean particle size ($D_{50}$) of 0.05 to 10 $\mu$m.

10. The method according to claim 6, wherein the particles of the nonaqueous dispersion resin (d) are not crosslinked internally.

11. The method according to claim 10, wherein the nonaqueous dispersion resin (d) melts during the baking step to be integrated with a resin of the intermediate coated layer.

12. The method according to claim 1, wherein the flake-like pigment (e) is selected from the group consisting of mica, alumina, talc and silica.

* * * * *